United States Patent [19]

Komatsu et al.

[11] Patent Number: 4,706,004
[45] Date of Patent: Nov. 10, 1987

[54] PLAYBACK SYSTEM GRINDING ROBOT

[75] Inventors: Isamu Komatsu, Sagamihara; Kenkichi Serizawa, Yamato, both of Japan

[73] Assignee: Aida Engineering, Ltd., Sagamihara, Japan

[21] Appl. No.: 678,152

[22] Filed: Dec. 4, 1984

[30] Foreign Application Priority Data

Dec. 10, 1983 [JP] Japan ................. 58-233332
Dec. 19, 1983 [JP] Japan ................. 58-239329
Apr. 20, 1984 [JP] Japan ................. 59-79715

[51] Int. Cl.$^4$ ........................................ G05B 19/10
[52] U.S. Cl. .................... 318/568; 318/572; 318/574; 901/4; 901/15; 364/474; 364/513
[58] Field of Search .......... 901/4, 15, 17, 28, 41; 364/474, 475, 513; 318/568, 567, 579, 570, 572, 574

[56] References Cited

U.S. PATENT DOCUMENTS

| | | | |
|---|---|---|---|
| 335,568 | 2/1886 | Cutler | 51/126 |
| 3,888,049 | 6/1975 | McSween | 51/126 |
| 4,017,723 | 4/1977 | Fickes | 318/570 |
| 4,140,226 | 2/1979 | Richter | 901/15 |
| 4,178,632 | 12/1979 | Anthony | 901/5 |
| 4,242,017 | 12/1980 | De Fazio | 901/41 |
| 4,263,538 | 4/1981 | Richiardi | 901/4 X |
| 4,298,308 | 11/1981 | Richter | 318/568 X |
| 4,305,128 | 12/1981 | Manabe | 318/570 X |
| 4,329,110 | 5/1982 | Schmid | 901/4 X |
| 4,348,634 | 9/1982 | David | 901/4 X |
| 4,357,664 | 11/1982 | Imazeki | 364/474 |
| 4,360,886 | 11/1982 | Kostas | 901/4 X |
| 4,367,532 | 1/1983 | Crum | 901/4 X |
| 4,378,959 | 4/1983 | Susujara | 901/15 |
| 4,392,776 | 7/1983 | Shum | 901/15 X |
| 4,394,608 | 7/1983 | Tryber | 364/474 X |
| 4,400,781 | 8/1983 | Hotta | 364/474 |
| 4,445,184 | 4/1984 | Noguchi | 901/15 |
| 4,456,962 | 6/1984 | Imazeki | 364/474 X |
| 4,472,668 | 9/1984 | Mutschler | 318/568 |
| 4,490,946 | 1/1985 | Tsujiuchi | 364/474 X |
| 4,501,094 | 2/1985 | Veale | 51/165.71 |
| 4,520,597 | 6/1985 | Lindberg | 51/126 |
| 4,523,409 | 6/1985 | De Fazio | 51/165.71 |
| 4,534,694 | 8/1985 | Tuda | 901/15 X |
| 4,603,511 | 8/1986 | Komatsu et al. | 51/165.71 |

OTHER PUBLICATIONS

ASEA News, published by ASEA INC., White Plains, N.Y., dated Sep. 1978, pp. 1 and 2.

Primary Examiner—William M. Shoop, Jr.
Assistant Examiner—Patrick C. Keane
Attorney, Agent, or Firm—Holman & Stern

[57] ABSTRACT

A playback system grinding robot is disclosed which includes a No. 2 arm attached for ocillation to the head of a No. 1 arm turning around a main axis, a drive arm arranged adjacent to the No. 1 arm so as to drive the No. 2 arm, and abrasive tool attached to the No. 2 arm head axis and pressed perpendicularly downward by a fluid cylinder to be freely turnable in different directions, and possessed of a dual degree-of-freedom of control in the polar coordinate system. A positional data generator for indicating a horizontal movement position of the abrasive tool is also provided as is a memory to store directional data together with positional data in the memory at the time of "teaching", especially to input turnback point data on the tool traveling locus exactly into the memory in accordance with a change of the directional data. A control device is included for decelerating the tool motion when the directional data are changed at the time of "playback work" and determines proper speed of the abrasive tool by using the directional data jointly with a variation in volume of the positional data. The control device also causes the abrasive tool to move in a zigzag manner, as well as a random manner on its route, thereby ensuring a manufacture of the polished products free from sharp differences in apparent surface finish between work areas and other areas.

3 Claims, 15 Drawing Figures

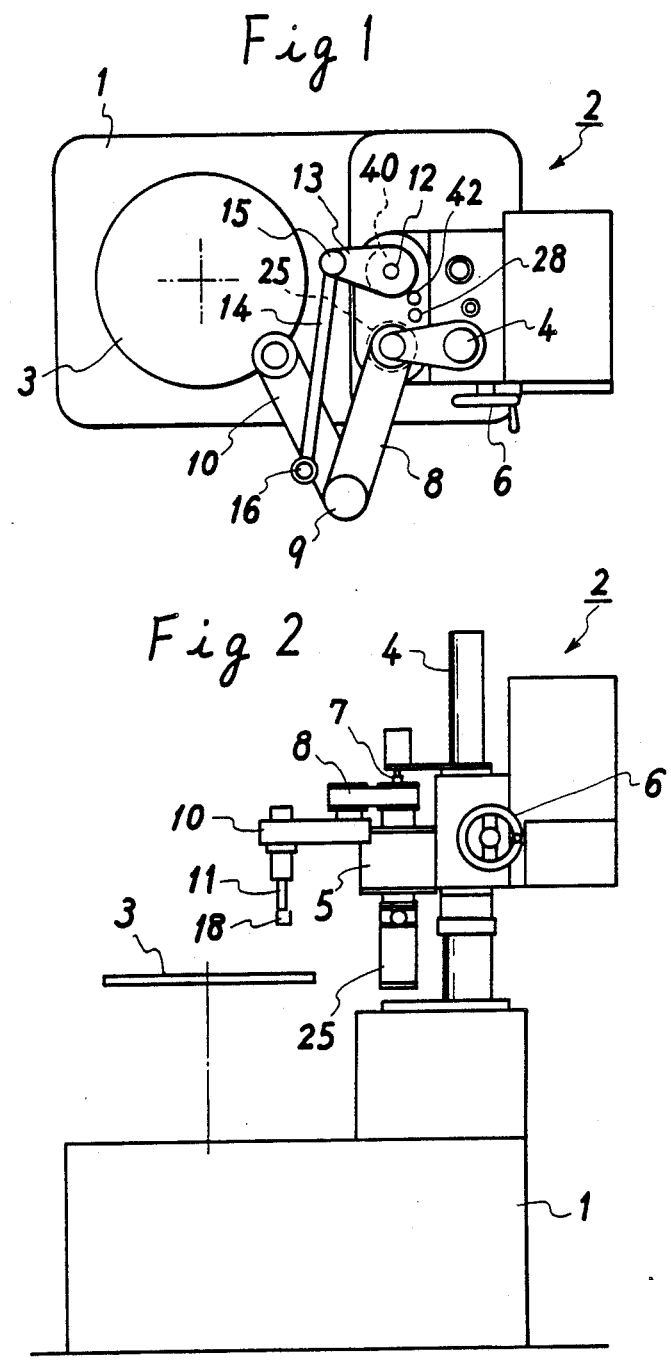

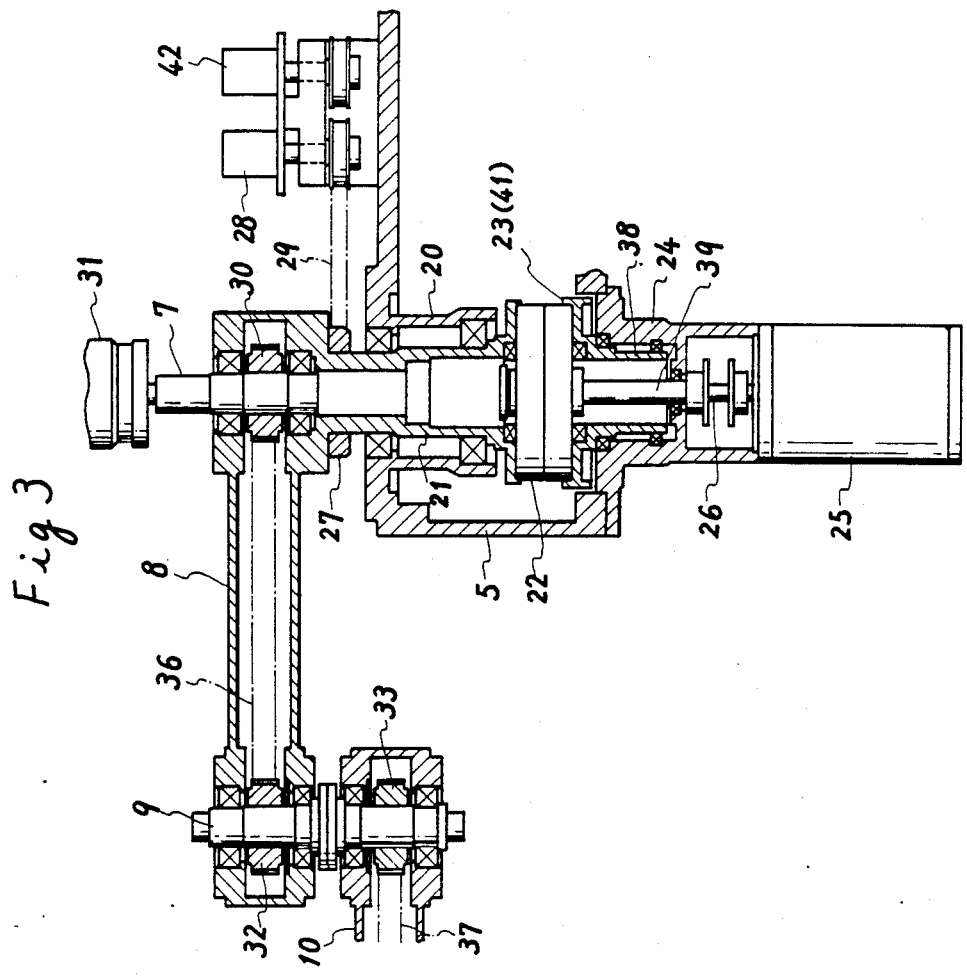

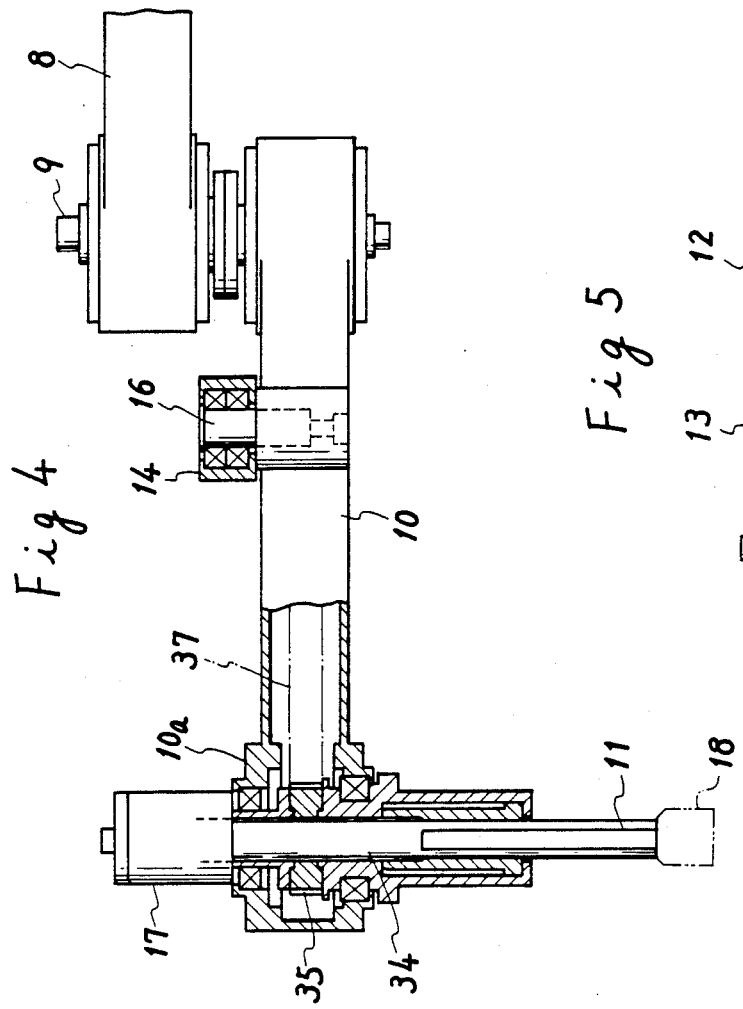
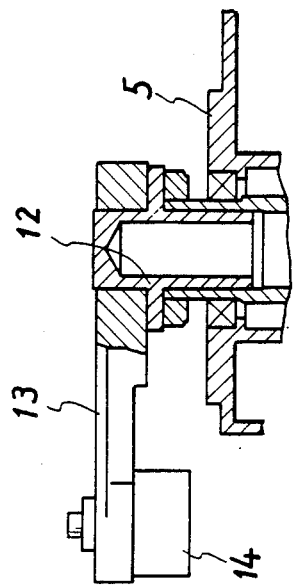

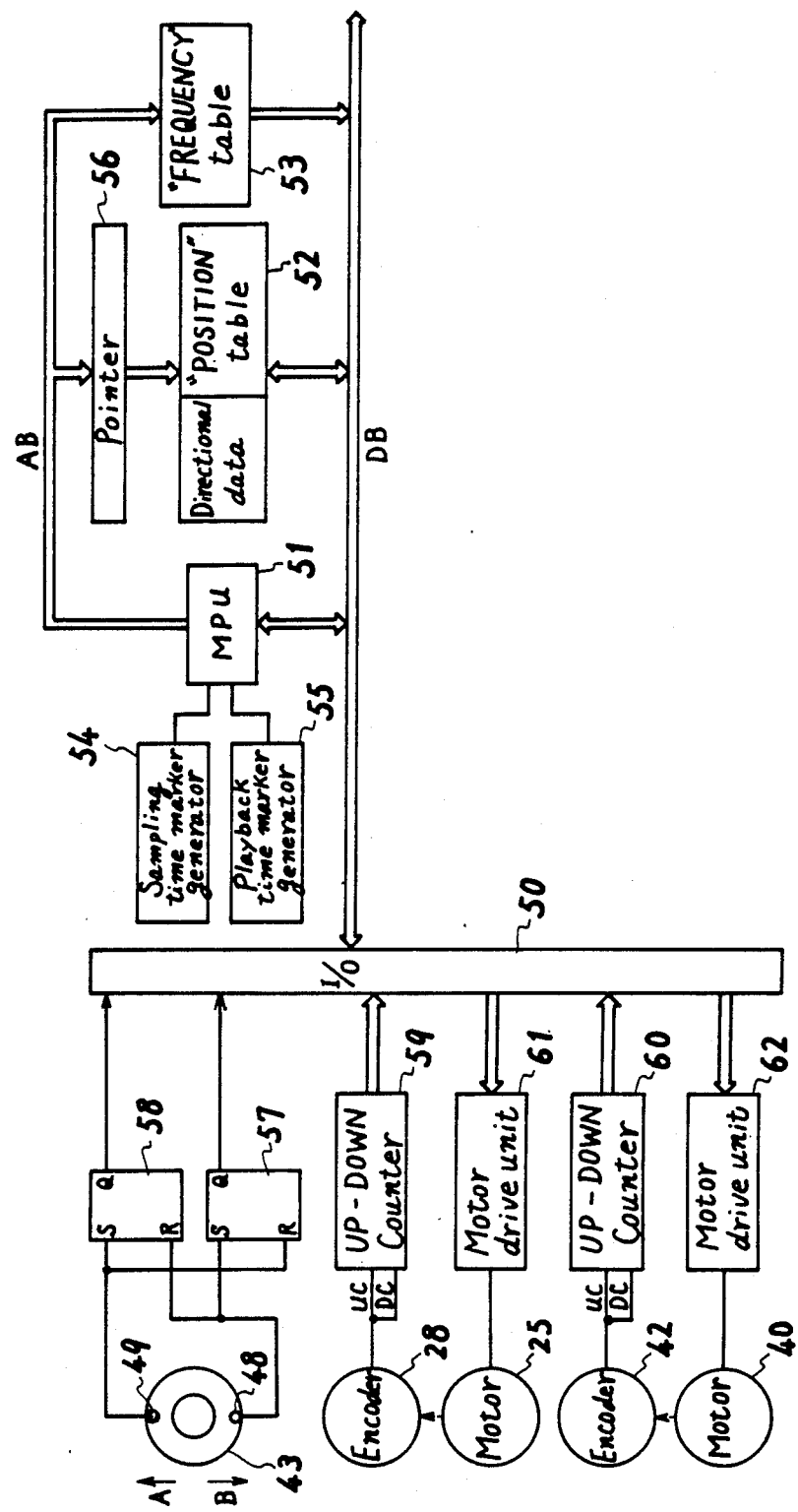

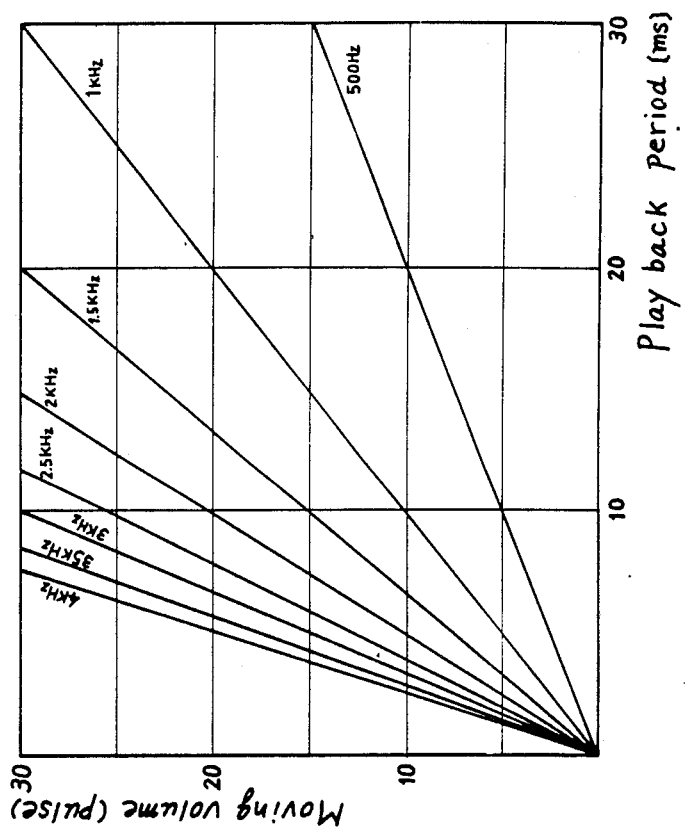

PLAYBACK SYSTEM GRINDING ROBOT

FIELD OF THE INVENTION

The present invention relates to a playback system die grinding robot with a dual degree-of-freedom of polar coordinates, and more particularly, to the playback system grinding robot which is so contrived that No.2 arm is pivoted on a head of a freely turnable No.1 arm and an abrasive tool is fitted to a head of said horizontally moving No. 2 arm. The die is pressed perpendicularly downward to be in close contact with the curved surfaces of the die.

Further, the present invention relates to an entirely new and unique grinding robot designed to conduct an appropriate playback work in accordance with a the processing accuracy demanded and also does not create any detachable process difference on the workpiece surface to be ground.

Conventionally, a three dimensional control playback system robot has been employed in the field of welding work, etc., however, it has been required to incorporate a large scale memory device and input program in its mechanism. And, there have been numerous cases where an abrasive tool is fitted to this type of grinding robot and is directly put in practical use, especially in grinding work of a free curved-surface. But, in such manufacturing industries, the problems of a large scale 3-dimensional memory device and input program still remain unsolved.

However, making an analysis of the grinding work carried out by manual labor from the viewpoint of its operation, it may be understood that the work is of a simple pattern to repeat linear movements along the profile of a free curved-surface while pressing down the grindstone on the workpiece surface, and the work itself is relatively of an uncomplicated movement.

From a result of such analysis, the grinding robot according to the present invention is so designed that the abrasive tool attached to the arm head is pressed perpendicularly downward by the force of an air cylinder in a direction of a Z-axis on the coordinate system while moving it always along a profile of the workpiece surface and at the same time the arm is capable of performing a plane movement to the directions of an X-axis as a well as Y-axis. Namely, the present invention aims to provide such a grinding robot wherein is possible to exactly control the abrasive tool motion merely with the positional data of X- and Y-axes of the coordinate system and to minimize the memory device, and to stabilize the playback action without using any input program.

In the grinding work of this type grinding robot, as the points on the locus that the abrasive tool has to travel exist innumerably, it is practically impossible to fully memorize these points one by one at the time of the "teaching" operation. Therefore, in the prior art, the operator has hitherto given a memory instruction of the travel point in an optional position on the locus to the robot at the time of "teaching" and the robot has stored the positional data pertaining to the said travel point it has been instructed to memorize.

By the way, the grinding work is not always demanded to have a uniform process accuracy all over the workpiece surfaces. Generally, in complicated shape portions, it is required to process to a highly precise condition, and in uncomplicated plane portions, it is not necessary to the peice so accurately. Therefore, in some of the conventional robots, the operator has given a memory instruction cautiously to the robot whenever he moves the abrasive tool inchingly to make the robot memorize more exact position data as for a portion where the highest process accuracy is demanded, while he has given the memory instruction of the positional data in his own way whenever the robot's abrasive tool travels on the locus as for a portion where a generous tolerance is allowed. And, these instructions have all been given at the operator's optional discretion, so that the mental and physical burdens of the operator have been obliged to result in very serious problems. Especially, with regard to the "teaching" operation for a turnback point on the reciprocatingly travelling locus of the abrasive tool, scrupulous care has had to be taken on the proceeding of the grinding work.

SUMMARY OF THE INVENTION

It is therefore a principal object of the present invention to solve these drawbacks existing in the prior art and to provide an entirely new playback system grinding robot comprised of: a means for generating directional data to indicate a moving direction of the abrasive tool in addition to a means for generating positional data to indicate a position of the said abrasive tool, a means to memorize said data in accordance with a given period of sampling clock signal at the time of "teaching", especially to store the positional data pertaining to a turnback point on the abrasive tool travelling locus exactly when the directional data are changed and; designed to forcedly decelerate the abrasive tool movement according to the change of directional data in the case of "playback" work and to determine a process speed of the playback work according to the variation volumes of said stored positional data and directional data and to enable playback-working suited to the required process accuracy with a mere operation to move the abrasive tool along the locus learned at the time of "teaching".

Generally, in the grinding work, when doing it consecutively and reciprocatingly many times for a grinding object, the processor concerned will probably encounter a hard problem, that a process texture difference is created on the workpiece surface in the boundary areas of the abrasive tool traveling route because it travels repeatedly only along the same locus.

Although this seems to be solved by inputting the positional data of both sides of the main tool travelling locus at the time of the "teaching" operation, if the work is merely carried out to create a long and narrow belt-shaped grinding surface, the problem of a superficial difference being formed on the boundary areas of both sides of the locus will not be solved. To solve this problem, the processor has to carry out the work in accordance with a procedure learned by the "scrupulous teaching" as in the manual labor operation, but if so, the work will require much time and labor. As the result, a capacity of the memory device for storing positional data will have to be enlarged.

It is therefore another object of the present invention to solve the aforementioned problems by an apparatise having a correcting direction indicating flag to change a status whenever the positional data are read out of the "position" table by scanning it a given chamber of times, and having a correction data register to store in advance a correction ratio or a correction volume pertaining to the positional data which are newly incorporated in the robot mechanism in addition to the conventional structures. The peripheral areas of the abrasive tool travelling locus which are indicated by the positional data accessed from a "position" table can be ground without creating any difference on the workpiece surface by adding a correction corresponding to the status of the aforesaid correcting direction indicating flag (i.e. a correction based on a given correction ratio or a given correction volume) to the positional data read out of the "position" table and further by creating a number of the abrasive tool travelling loca at random according to the positional data subsequent to the correction. it is also and object to provide an entirely new and unique playback system grinding robot which enables grinding both peripheral areas of the abrasive tool main travelling locus without enlarging the positional data storage capacity and without incurring the trouble of the "teaching" operation.

BRIEF DESCRIPTION OF THE DRAWINGS

FIG. 1 is an overall plan of the robot according to the present invention;

FIG. 2 is a front elevation view of the robot according to the present invention;

FIG. 3 is a longitudinally sectioned elevation view of a principal part of a No.1 arm;

FIG. 4 is a longitudinally sectioned elevation view of a principal part of a No.2 arm;

FIG. 5 is a longitudinally sectioned elevation view of a principal part of the arm for driving the No.2 arm;

FIG. 8 is a block diagram of the control circuit;

FIG. 9 is an explanatory illustration of "position" table;

FIG. 10 is an explanatory graph of the "frequency" table;

DETAILED DESCRIPTION OF THE INVENTION

Figure 6:
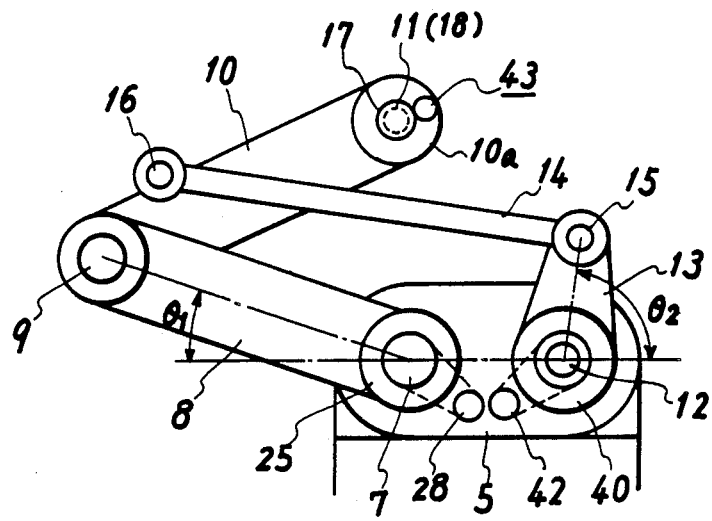
FIG. 6 is an operational illustration of the arm.

Initially, referring to FIGS. 1 and 2, overall drawings of the present equipment are shown therein. A bedplate (1) is provided with a tool drive mechanism (2) and a table on which a workpiece is positioned. The tool drive mechanism (2) is so designed that a case (5) attached in a freely slidable condition to a guide bar (4) standing on the bedplate (1) can ascend and descend by the operation of a handle (6), and the case (5) is provided with a first, No.1, arm (8) turning around a main axis (7) and a second No.2, arm (10) connected by means of a pivot (9) to a head of said No.1 arm (8), and a holder (11) to fix an abrasive tool (18) is attached to a head of said No.2 arm (10). Further, a link (14) is connected by means of a pair of pins (15) & (16) to a portion between an arm (13) for driving No.2 arm abent a revolution shaft (12) arranged adjacent to the said main axis (7) and No.2 arm (10) designed to be possible to fix the abrasive tool. Each turning motion of No.1 arm (8) and the arm (13) for driving No.2 arm is actuated by a resultant force composed by both of No.2 arm (10) and link (14) and provides a horizontal movement for the abrasive tool (18) fixed to the holder (11).

Referring then to FIGS. 3 and 4, a structure is shown to turn No.1 arm (8), which is built in the case (5) which can be seen therein. A revolution cylinder (21) extending upward from the case (5) is inserted in a freely rotatable condition into a holding cylinder (20) arranged in the case (5) and, No.1 arm (8) is monolithically attached to the upper portion of the said revolution cylinder (21). And, a bottom portion of the revolution cylinder (21) is connected to a central axis (39) through a differential gear system speed reducer (22). Further, a brake plate (23) is fixed to the said case (5) and a cylinder portion (38) extending down ward is supported in a freely rotatable condition by a holding cylinder (24) fitted to the case (5). The aforementioned central axis (39) is connected to an output axle (26) of a servomotor (25) attached to the bottom portion of the holding cylinder (24).

The servomotor (25) is of a clockwise and counterclockwise rotatable type. Rotating now the servomotor (25), a revolutionary force of its output axle (26) will be decelerated through the speed reducer (22) and then transmitted to the revolution cylinder (21) and act to cause No.1 arm (8) as well as the said revolution cylinder (21) to turn around the main axis (7).

The aforesaid revolution cylinder (21) is provided with a toothed disc (27), which is connected with a rotary encoder (28) built in the case (5) by means of a toothed belt (29). The rotary encoder (28) acts to detect a turning angle of No.1 arm (8) and at the same time causes the servomotor (25) to run clockwise and counterclockwise within the range of a given turning angle, thereby enabling No.1 arm (8) to turn reiteratively.

The present invention will then be described as to a turning mechanism of the tool holder by reference to FIGS. 3 and 5. The aforesaid main axis (7) supports a root end of No.1 arm (8) and incorporates a toothed pulley (30) rotating inside the said No.1 arm (8), and a motor (31) is mounted on a portion projecting from No.1 arm (8) supported by the said main axis (7). Further, the aforesaid pivot (9) which is arranged at a connection part of No.1 arm (8) and No.2 arm (10) incorporates a pair of pulleys (32) and (33) which are rotated inside the respective arms and also another toothed pulley (35) is fitted to a revolution axis (34) of the holder (11) arranged at the head of No.2 arm (10). The aforementioned four (4) toothed pulleys (30), (32), (33) and (35) are each of an equidiameter and designed to transmit a revolutionary force of the motor (31) to the holder for attaching the abrasive tool (18) by arranging a toothed belt (36) between the pulleys (30) and (32) inside No.1 arm (8) as well as a toothed belt (37) between the pulleys (33) and (35) inside No.2 arm (10). In this case, the abrasive tool (18) is contrived to be possible to freely change its turning direction through the rotation of motor (31).

By the way, the aforesaid revolution shaft (12) of the arm (13) for driving No.2 arm to reiteratively move the link (14) is supported rotatably by the case (5) and designed to be rotated clockwise and counterclockwise via a speed reducer, by the servomotor (4) arranged under the case (5). Although the said speed reducer is unillustrated here, its structure is identical with one connected to the foregoing revolution cylinder (21) and a brake plate (41) is fitted likewise thereto, and each brake plate (23) and (41) of the two is arranged in position at the same level.

In addition to the above, a toothed disc (unillustrated) of the same type as one (27) fitted to the aforementioned revolution cylinder (21) is attached to the revolution shaft (12) and connected to another rotary encoder (42) arranged adjacent to the aforesaid rotary encoder (28) with a toothed belt (unillustrated). This rotary encoder (42) acts to detect a turning angle of the arm (13) for driving No.2 arm and to control the servomotor (40).

In this connection, a force to press down the abrasive tool on the workpiece surface is contrived to be produced by an air cylinder (17) arranged on the tool holder (11) (this structure is unillustrated).

The present invention will then be described as to an operational procedure of the robot. The present equipment is a playback system robot to carry on the grinding work according to the selfsame procedure as taught at the time of "teaching" that the operator inputs the contents of work into the memory device while gripping and moving the tool holder (11) along a profile of the workpiece. In this case the operator has to release the speed reducer (22) prior to proceed to the "teaching" in order to minimize a turning force of Nos.1 and 2 arms (8 & 10). After this, the operator has to put a series of information of the working procedure suited to a shape of the workpiece into the memory device.

After completion of the "teaching" operation, a braking force is applied to the brake plates (23) and (41), and the grinding work can then soon be initiated.

As can be understood from the above-noted explanation, the grinding work according to the present invention is effected by a mere operation to move the abrasive tool holder along a profile of the workpiece in the same way as taught at the time of "teaching". In that case, although the abrasive tool plays through a 3-dimensional movement at that time, the driving arm plays through only a horizontal movement, so that a control operation of the abrasive tool can completely be accomplished by only the positional data of the X-axis and Y-axis coordinates. This makes it possible to minimize the accessary memory device capacity, and to simplify an input program, and also to stabilize the playback work and further to improve an efficiency of the grinding work.

Also, the abrasive tool (18) can be turned in direction through an angle of 90 degrees by rotating a tool drive motor (31) shown in FIG. 3, so that the abrasive tool can turn its posture in an optional direction in accordance with the motion of the No.1 arm (8) and the No.2 arm (10) to move the tool (18). Moreover, if the work is carried out with the selection of a kind of tool, e.g. a tool suited for grinding work of the curved surface, a tool suited for grinding work of the plane surface, etc., its efficiency will be enhanced. Further, in the grinding robot under the present invention, the table device (3) fixing the workpiece thereon can freely be turned and inclined, the efficiency of the grinding work will drastically be heightened, thus providing a great deal of effects and advantages for users.

Referring then to FIG. 6, an explanatory illustration of the arm motion of the playback robot according to the present invention is shown therein. As the present grinding robot has a dual degree-of-freedom in polar coordinates, a position of the abrasive tool is determined by both an angle $\theta_1$ which is formed between No.1 arm (8) and a fiducial line as well as an angle $\theta_2$ which is formed between a fiducial line and the arm (13) for driving No.2 arm (10). For this reason, the aforesaid rotary encoders (28) and (42) are respectively connected to the motor (25) to turn the No.1 arm (8) and to the motor (40) to turn the arm (13) for driving the No.2 arm, thereby making it possible to catch a position of the abrasive tool (18). An arm structure of the playback robot shown in FIG. 6 is designed to receive the "teaching" of the grinding work while gripping a handle (43) attached to a head (10a) of No.2 arm (10) and travelling the abrasive tool along a profile of the actual workpiece surface, while, in FIG. 1, the "teaching" operation is carried out by using the tool holder (11). In this case, the handle (43) is provided with a pair of direction sensors (48) and (49) in order to detect "which direction the abrasive tool (18) moves to".

Figure 7:
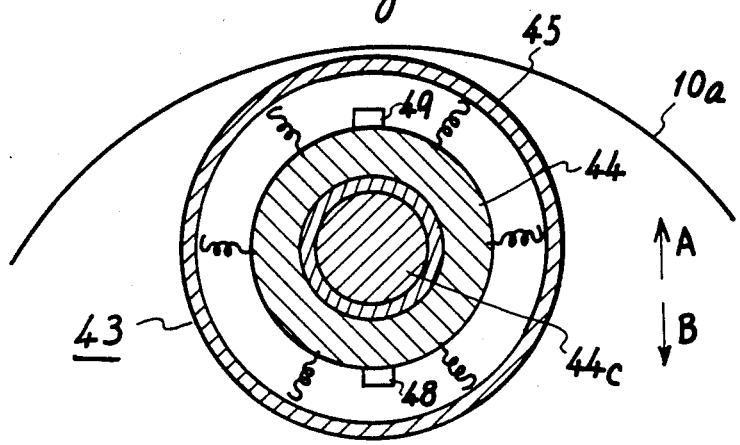
FIG. 7 is a cross-sectional elevation view of the direction detector.

Referring to FIG. 7, one example of said direction sensors (48) and (49) attached to the handle (43) are illustrated therein, where an inner cylinder (44) is attached to a mandrel (44c) fixed at a head portion (10a) of No.2 arm (10) in a freely rotatable condition. A handle outer cylinder (45) is supported by means of a pair of coiled springs (46) and (47) around an external circumference of the inner cylinder (44), and a plus direction detector (48) as well as a minus direction detector (49) which are, for example, comprised of a microswitch, etc. are arranged around the outer circumference of said handle inner cylinder (44). Accordingly, if the operator moves the abrasive tool (18) to a direction shown with an arrow "A" while gripping the handle outer cylinder (45), the said plus direction detector (48) is pressed by both of the handle inner cylinder (44) and the handle outer cylinder (45) and turns to "ON", while the minus direction detector turns to "ON" if the abrasive tool is moved to a direction of "B".

Incidentally, the work is more effectively performed if the plus and minus directions of the direction sensors are adjusted to coincide with the reciprocating movement direction of the abrasive tool. Accordingly, when the reciprocating movement direction of the tool is changed largely, it is preferable to rotate and adjust the inner cylinder (44) to make the tool moving direction coincide with the plus and minus directions of the sensors (48) and (49).

Referring then to FIG. 8, a block diagram of the robot control circuit according to the present invention is shown therein. In FIG. 8, the numerals (57) and (58) show flip-flop mechanisms to store the robot's moving directions at the time of "teaching" and the flip-flop (57) is set when the plus direction detector (48) turns to "ON" and is set when the minus direction detector (49) turns to "ON". On the contrary, the flip-flop (58) is set when the minus direction detector (49) turns to "ON" and reset when the plus direction detector turns to "ON". Therefore, the flip-flop (57) is set, the handle (43) is moved to a direction shown with the arrow "A" and when the flip-flop (58) is set, the handle (43) is moved to a direction of "B".

A numeric number (28) shows an encoder connected to the main axis (7) and likewise a numeric number (59) shows an UP-DOWN counter. The encoder (28) produces a pulse signal synchronously with the turning motion of No.1 arm (8) revolving around the main axis (7) and, the counter (59) acts to count up and down with this pulse signal. Therefore, a value counted by the counter (59) indicates the aforementioned angle $\theta_1$ which is formed between No.1 arm (8) and the fiducial line. In this way, the encoder (28), as it is connected to the main axis (7), generates a count-up clock signal "UC" and a count-down clock signal "DC" in both of the cases where the No.1 arm is rotated due to a rotation of the motor (25) and also the No.1 arm (8) is rotated by moving the abrasive tool (18) at the time of "teaching", and causes a count motion of the counter to step forward. A value counted by the counter (59) at the time of "teaching" is used for indicating a location of a series of the points on the abrasive tool traveling locus, while a value counted by the counter (59) at the time of "playback" is put out as a feedback information signal to indicate an present position of the abrasive tool (18).

Further, a numeric number (61) shows a motor drive unit to provide an excitation pattern for the motor (25) and to actuate it. Its structure and action are known by any person well versed in this art.

Moreover, as the grinding robot according to the present invention shown in FIG. 6 has a dual degree-of-freedom of polar coordinates, an encoder (42), a motor (40), a counter (60) and a motor drive unit (62) are prepared for a count system of the 1st series to actuate the arm (13) for driving the No.2 arm, as shown in FIG. 8. A count system of the 2nd series is of the entirely same in structure as that of the 1st series, that such a redundant explanation may be omitted here, except as to a point pertaining to a motion of the arm (13) for driving the No.2 arm.

And, these units are connected to the control system through an input-output interface (50).

Although this type of control system is generally composed of a microcomputer in which a microprocessor (51) and memory elements are incorporated in the heart of the mechanism, the control system according to the present invention is comprised of a RAM-composed table (52) and a ROM-composed table (53).

Referring to FIG. 9, an explanatory illustration of the "table" in the memory device is shown therein. An upper bit column of the table (52) is assigned for each output of the flip-flops (57, 58) and a lower bit column of the table (52) is assigned for each output of the counters (59, 60) and acts to store the abrasive tool position.

FIG 10 shows the functional contents of the table (53); its axis of abscissas shows a period of playback and its axis of ordinates shows a moving volume of the abrasive tool at the period of "playback", and each oblique line shows a frequency of the excitation pattern's generation to be given to the motors (25) and (40).

Incidentally, in FIG. 8, a numeric number (54) shows a sampling time marker generator to produce a sampling clock signal at the time of "teaching", and a numeric number (55) shows a playback time marker generator to generate a playback clock signal at the time of "playback", and likewise (56) shows a pointer to indicate an address of the table (52), and (DB) shows a data bus and (AB) shows an address bus respectively.

The present invention will then be explained as to an aspect of action of the robot employed in the embodiment.

Figure 11:
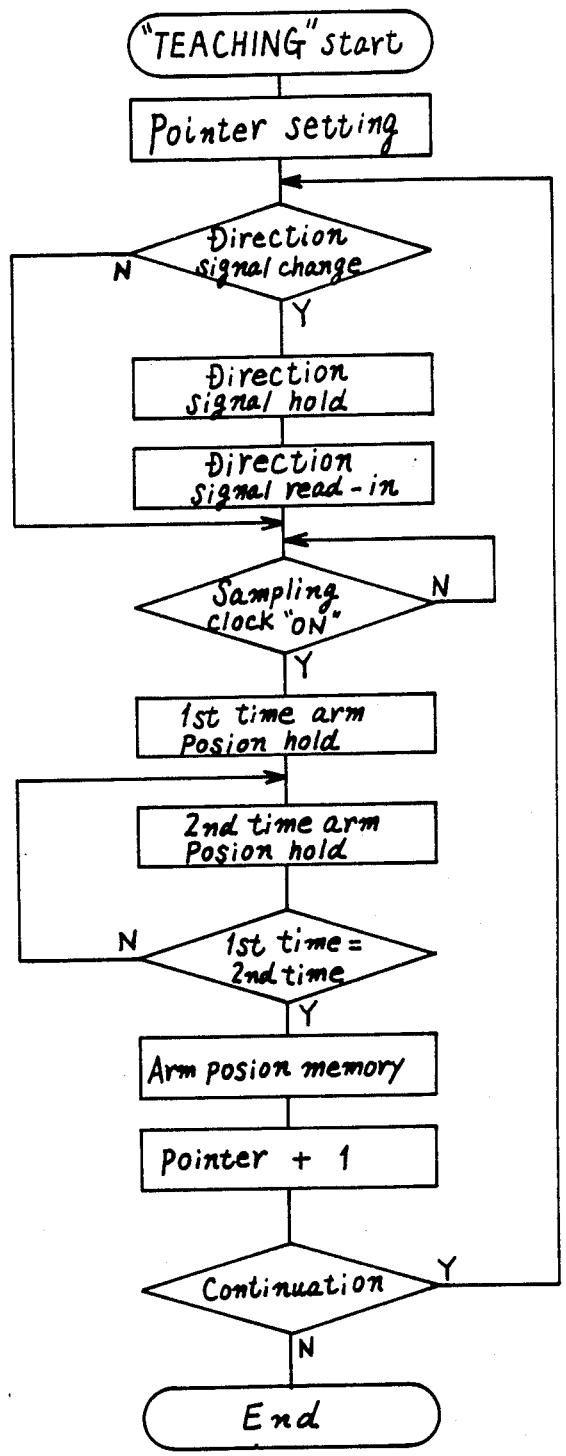
FIG. 11 is an operational flow chart at the time of "teaching"

FIG. 11 shows an operational flow chart at the time of "teaching". In this "teaching", thoughtful consideration is paid to enable the operator to obtain appropriate data suited to the required process accuracy without keeping close watch on the timing of a sampling operation fitted for the process accuracy required.

Initially, let it be supposed that a start instruction of the "teaching" mode is now given to the robot. A microprocessor (51) will then act to set up "0" to a pointer (56) and to specify the No. "0" address in the table (52). Thereupon, gripping and moving the handle (43) to travel the abrasive tool (18) on an optional locus, the work will then be initiated.

At this time, if the abrasive tool is moved to a direction shown by the arrow "A", a microswitch (48) will turn to "ON" and actuate to set the flip-flop (57), but if the abrasive tool (18) is moved to a direction "B", a microswitch (49) will turn to "ON" and actuate to set the flip-flop (58).

And, if the abrasive tool is moved to a certain direction, No.1 arm (8) will start to turn centering around the main axis (7) with the motion of the abrasive tool and the arm (13) for driving the No.2 arm will also start to turn centering around the revolution shaft (12). When the aforementioned angle $\theta_1$ becomes larger due to the turn of the No.1 arm (8), the encoder (28) will generate the count up clock signal "UC" and cause the counter (59) to count up. On the contrary, when the angle $\theta_1$ becomes smaller, the encoder (28) will generate the count down clock signal "DC" and cause the counter (59) to count down. Therefore, a value counted by the counter (59) comes always to indicate a value of the angle $\theta_1$. Further, when the angle $\theta_2$ becomes larger due to the turn of the arm (13) for driving the No.2 arm, the encoder (42) will produce the count up clock signal "UC" and cause the counter (60) to count up, while, if the angle $\theta_2$ becomes smaller, the encoder (42) will produce the count down clock signal "DC" and cause the counter (60) to count down. Therefore, a value counted by the counter (60) comes always to indicate a value of the angle $\theta_2$.

Moreover, when the "teaching" mode actually starts the sampling time marker generator (54) will generate a given period of the sampling clock signal which is fed to the microprocessor (51). The microprocessor (51) will then read the data out of the input-output interface (50) synchronously with the emission of this sampling clock signal. Incidentally, a period of this sampling clock signal is beforehand registered in the sampling time marker generator (54).

The mircroprocessor (51) also acts to monitor each status of the flip-flops (57, 58) and to catch any change which might be caused in moving directions of the abrasive tool (18). When the "teaching" operation is initiated, the flip-flops (57) and (58) will both be reset. But, if the operator moves the abrasive tool (18) to any direction, either of the flip-flops (57) or (58) will be set. Therefore, the microprocessor (51) will judge the tool moving direction to have been changed and hold the status datum of the flip-flip (57) or (58) and write it in a upper bit column of No. "0" address of the table (52).

Although this status datum is shown in a flow chart of FIG. 11 to be stored whenever the status of the flip-flop (57) or (58) is changed, there is no objection in writing the status data of flip-flops (57) and (58) in the upper bit column of the table (52) one by one irrespective of the said status change.

And, the microprocessor (51) acts to hold a value counted by the counters (59) and (60) successively two times synchronously with the timing at the time when the sampling time marker generator (54) produces a sampling clock signal and, if a value held at the 1st time accords with that of the 2nd time, the microprocessor acts to write its value in an lower bit column of No."0" address of the table (52).

In this way, the microprocessor acts to add a value of "1" to a pointer (56) whenever the sampling clock signal is generated and to repeat the foregoing actions likewise, and then to store both of the directional data and the positional data of No.1 arm (8) and the arm (13) for driving the No.2 arm respectively in the lower bit and the upper bit columns subsequent to No."1" address. This completes the "teaching" operation.

As noted above, in the present embodiment, a sampling of the data is carried out synchronously with the emission of a certain period of sampling clock signal, so that the data stored in the lower bit column of each address of the table (52) is defined as each angle $\theta_1$ and $\theta_2$ of the No.1 arm (8) and the arm (13) for driving the No.2 arm at the time of sampling, and also the variation volume of each angle $\theta_1$ and $\theta_2$ undergoing a change every period of sampling is defined as the respective angular velocities of the No.1 arm (8) and the arm(13) for driving the No.2 arm.

Accordingly, in the case where the "teaching" operation is carried out by tracing the travelling locus of the abrasive tool (18), the operator will generally move the abrasive tool slowly and gently when it comes to such a portion that the process accuracy is strictly requested. Therefore, the variation volume of each angle $\theta_1$ and $\theta_2$ undergoing a change within a specified period, i.e. each angular velocity of No.1 arm (8) and the arm (13) for driving the No.2 arm will decrease. On the contrary, as the operator will move the abrasive tool relatively swiftly when it comes to such a portion that the process accuracy is not so strictly required, each angular velocity of No. the 1 arm (8) and the arm (13) for driving the No.2 arm will increase.

Consequently, according to the present embodiment, if the operator moves the abrasive tool of the arm head by the most natural motion in viewpoint of the human engineering, he will be able to store the positional and directional data of the abrasive tool properly into the memory device without paying special attention to the timing of data memorization.

Figure 12:
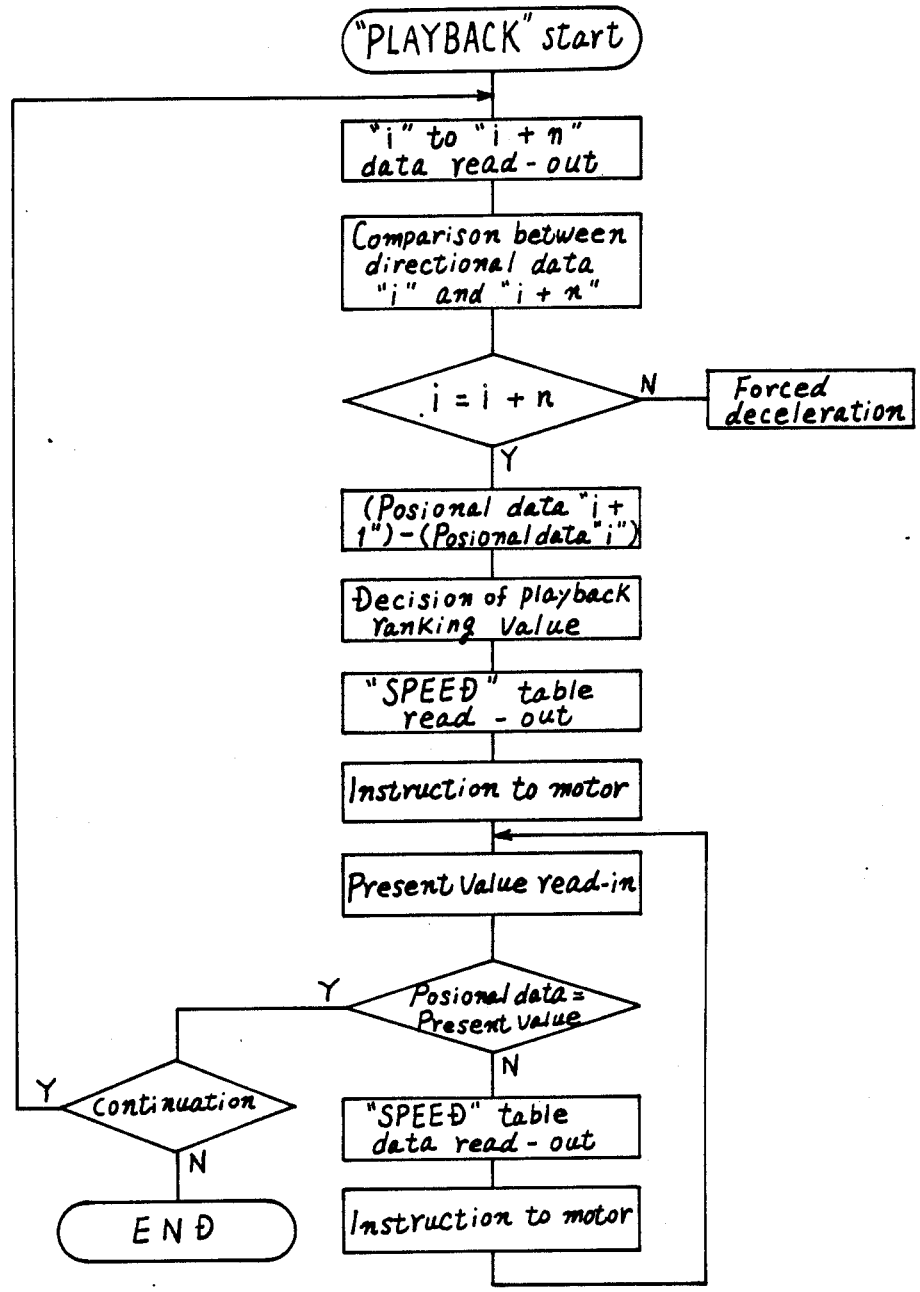
FIG. 12 is an operational flow chart at the time of "playback"

Referring then to FIG. 12, an operational flow chart at the time of "playback" is illustrated therein, which shows that the grinding work according to the present invention is carried out with scrupulous consideration to make it possible to practice the playback work suited to the required process accuracy at a reasonable "playback" work speed.

Before initiation of the "playback" work, the operator initially inputs the data pertaining to a period of the "playback" work and selects a playback mode from a control console. At this time, if the operator, for example, selects a value of 10 ms as a period of playback work, the aforementioned playback time marker time marker generator (55) emits a playback clock signal at a period of 10 ms and the microprocessor (51) acts to read its datum out of the table (52) every period of 10 ms, and puts out a signal to perform the playback work every said period.

When the "playback" mode is initiated, the microprocessor (51) initially functions to read out the data of No. "0" address through No."n" address in the table (52) synchronously with the emission of the playback clock signal sent from the playback time marker generator (55). In this case, a value of "n" may optionally be set up. For example, let it be supposed that a value of "5" is selected for "n". The microprocessor (51) will then act to make a comparison between a value of upper bit column of No.5 address and a value of upper bit column of No."0" address and to judge whether the moving direction of the abrasive tool (18) is changed or not. And, if the said moving direction is changed, the microprocessor (51) will give an instruction to the robot to enter into a forced deceleration, but when the said moving direction is unchanged, an instruction will be given to select a moving speed suited to the variation volume of the positional data.

That is to say, the microprocessor (51) functions to subtract a value of the No."0" address from that of the No."1" address and to access the thus subtracted value to a "frequency" table (53) as an address datum. The instruction data for frequency (i.e., frequency for motor drive pulse signal) are beforehand stored in the said "frequency" table, as shown in FIG 10, and the microprocessor (51) functions to read a certain frequency corresponding to the variation volume of positional data out of the said "frequency" table and to give its frequency datum through an input-output interface (5) to the motor drive units (61, 62), which cause the excitation pattern of motors (25) and (40) to renew successively with the use of this indicated frequency.

By the way, the variation volume per unit time of positional data is considerably large in such a portion that the operator moves the abrasive tool (18) swiftly, while it is relatively small in such a portion that he moves the tool slowly. However, since the "frequency" table (53) stores the instructed frequency corresponding to the variation volume per unit time of positional data, as shown in FIG. 10, a higher frequency will naturally be selected when the tool comes to a portion where the variation volume per unit time of positional data is large, while a lower frequency will be selected when the tool comes to a portion where the variation volume per unit time of positional data is small.

For example, let it be supposed that the period of playback work is 10 ms and the variation volume of positional data is 8 or 10 pulses every period of sampling on the basis of output of the encoders (28, 42). A value of frequency "1 KHz" will then be selected and in consequence, if the variation volume is 16 or 20 pulses, the frequency value of 2 K Hz will be selected.

Thus, the motor drive units (61, 62) act to renew the excitation pattern of the motors (25, 40) successively with the use of this instructed frequency, so that the abrasive tool (18) will be moved swiftly also at the time of playback work in the portion where the operator moved the abrasive tool (18) swiftly at the time of "teaching", and on the contrary, it will be moved gently also at the time of playback work in the portion where the operator moved the said tool gently at the time of "teaching".

In this way, when the motors (25, 40) start to run and the No. 1 arm (8) as well as the arm (13) for driving the No.2 arm turn centering around the main axis (7) and the revolution shaft (12) respectively, the encoders (28) and (42) act to generate a count-up clock signal "UC" and a count-down clock signal "DC" and cause the counters (59, 60) to step forward according to these count-up clock signal and count-down clock signal. In the present embodiment, the microprocessor (51) is also contrived to make it possible to emit a feedback signal pertaining to the tool position in accordance with the optionally demultiplied to the playback period.

To put it concretely, the microprocessor (51) acts to read each value counted by the counters (59, 60) in its mechanism as the data of present tool position through the input-output interface (50) according to a timing instructed within the period of "playback" and to subtract the thus read-in datum value from the datum value of the instructed tool position. For example, when the operator accesses some data from the "frequency" table on the basis of a difference between No."0" address and No."1" address in the table (52), a datum value of No. 1 address in the table (52) means an instructed tool position, so that an outcome subtracted a datum value of the present tool position will be obtained simply. The microprocessor (51) accesses said subtracted datum value to the "frequency" table (53) as the number of the address and provides an excitation clock signal with a frequency corresponding to a difference between the instructed position and the present position to the motors (61) and (62) respectively. In this way, when the instructed position accords with the present position, the address number in the table (52) will be renewed whenever the subsequent playback clock signal is given from the playback time marker generator (55), and the foregoing actions will be repeated likewise.

Further, if the directional data are adversely changed in the course of execution of the playback work, the microprocessor (51) will enter into a forced deceleration mode as noted above. To put it concretely, when a numeric value "5" is selected as a value of the No."n" address, if a datum value in the lower bit column of the No."i" address of the table (52) is of an instructed position, the microprocessor (51) functions to make a comparison between a directional datum shown by a value in the upper bit column of the No."i+n" address of the table (52) and a positional datum as shown by a value in the upper bit column of the No."i" address of the same, and if the two discord with each other, the microprocessor acts to enter into a forced deceleration mode and to read the minimum frequency (e.g., 500 Hz in the table of FIG. 10) out of the "frequency" table (53) irrespective of the variation volume of the positional data at that time and to provide its datum value to the motor drive units (61), (62) respectively. Accordingly, the motors (25, 40) run each at the lowest speed, so that the abrasive tool also moves at the lowest speed.

Incidentally, even in this forced deceleration mode, a routine for feedback of positional data is ready for use, so that the robot is possible to enter into subsequent work as soon as the present position accords with the instructed position.

In the foregoing description, the encoders (28, 42), the counters (59, 60), the motors (25, 40) and the motor drive units (61, 62) have been explained without sectionalizing every item, however, it is needless to say that two series of motions of the No.1 arm and the No.2 arm are respectively possible to be actuated independently.

As has been explained above, according to the present invention, the operator can input proper data of "playback" work suited to the required process accuracy into the memory device by doing a mere operation to trace the abrasive tool locus slowly in a portion where a fine motion, i.e. specific accuracy is required and swiftly in a portion where a generous motion may be allowed. Especially, the present robot is designed to make it possible to input the data of turnback point of the abrasive tool on the locus properly into the memory device by the function of the direction sensor. Accordingly, the operator becomes needless to pay special attention to the input timing of positional data, so that his physical and mental burdens will greatly be lightened.

Moreover, according to the present invention, when a moving direction of the abrasive tool is changed, the present robot is designed to move the abrasive tool at the lowest speed, so that the grinding process itself is effectively protected from various troubles which may be caused due to overrun, etc.

Further, the present robot is so contrived that the positional informations of the abrasive tool indicate an absolute location computed from the fiducial line. Therefore, even if the "playback" work is reiteratively carried out any number of times, there is no accumulation of error and, in consequence an exact playback work will always be assured.

Incidentally, it may remarked that a kind of coordinate pertaining to the arm joint as well as the number of degrees of freedom degree are not specifically limited, though the foregoing description has mainly been made on the basis of a specific robot having a dual degree-of-freedom of the polar coordinates.

Figure 13:
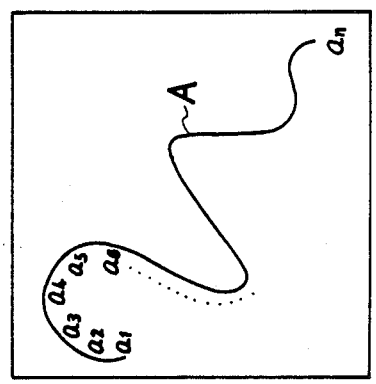
FIG. 13 shows an abrasive tool travelling locus of the conventional robot.

FIG. 13 is a diagram showing the conventional robot's drawbacks which the present invention aims to solve. When giving an instruction to the abrasive tool (18) at the time "teaching" to reiteratively grind the workpiece along the points "$a_1$" to "$a_n$" on the tool travelling route and putting the robot into grinding motion as per the "teaching", a facial difference is apt to be created on the peripheral areas of the said route. Thereupon, the present invention will then be described in further detail as to the grinding robot provided with a random correction flag device which removes the facial difference out of the workpiece surface to be ground by reference to FIGS. 14 and 15.

Figure 14:
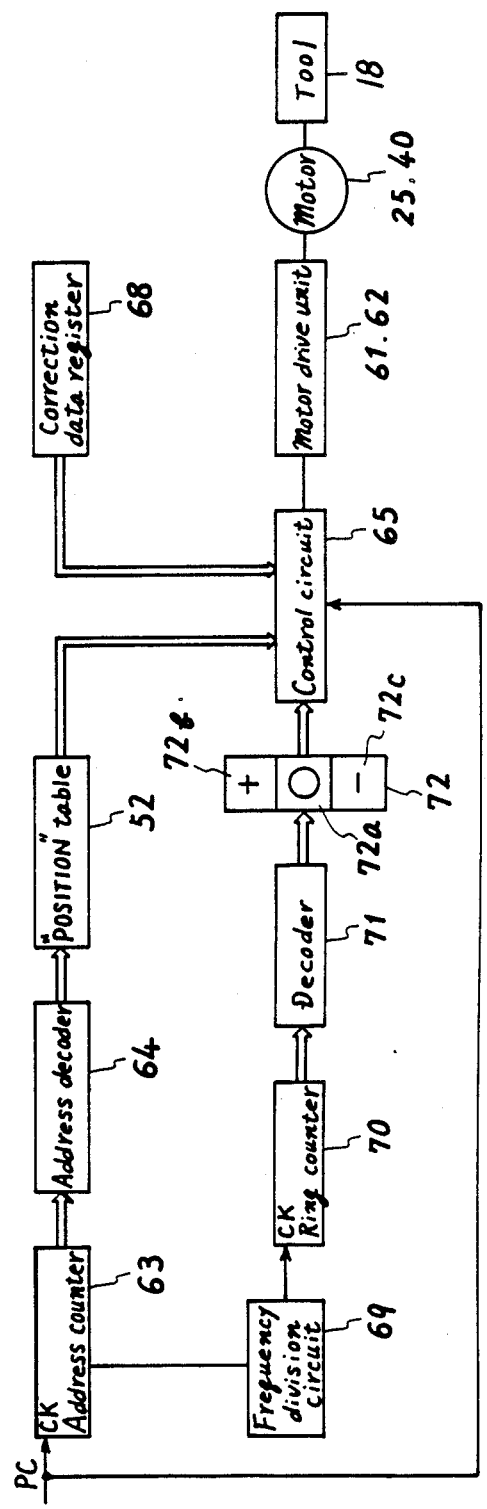
FIG. 14 is a block diagram of the control circuit.

FIG. 14 shows an operational block diagram of the grinding robot provided with a random correction flag device according to the present invention. A numeral (52) shows a RAM-composed position table to successively store the positional data, and likewise (63) shows an address counter to count a playback clock pulse "PC" and to renew an address in said position table (52), and the same (64) shows an address decoder to decode an output value of said address counter respectively. These units of "position" table (52), address counter (63) and address decoder are each known. The control circuit, fundamentally, acts to determine an excitation pattern to be excited according to the positional data sequentially read out of the position table (52) and to provide the thus decided excitation pattern to the motor drive units (61,62), which cause the motors (25, 40) to drive according to the given excitation pattern.

A numeral (68) shows a correction data register to store the correction volume of the positional data, and said correction volume is preset by the operator in advance. And, a numeral (69) shows a frequency division circuit to generate a pulse signal if a carry-over output of the address counter (63) is impressed to the said circuit by the preset number of times, and an output of the frequency division circuit is impressed to a ring counter (70) which is possible to take a count value of either of "1" or "3". A numeral (71) shows a decoder to decode an output of the ring counter (70) and the same (72) shows a flag to indicate a correctional direction. Incidentally, the flag (72) is composed of a zero "0" correction flag (72a), a plus "+" correction flag (72b) and a minus "−" correction flag (72c).

The present invention will now be described as for an aspect of the performance of the embodiment.

Figure 15:
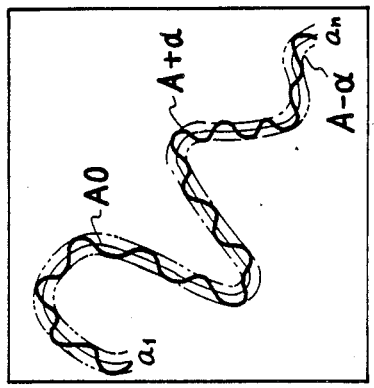
FIG. 15 shows an abrasive tool travelling locus of the robot according to the present invention.

Initially, referring to FIG. 15, a travelling locus of the abrasive tool (18) using a random correction flag device according to the present invention is illustrated therein. In the present embodiment, each positional datum of the abrasive tool on its travelling locus "AO" is sequentially inputted into the memory device at the time of "teaching" and stored in serial order in each address of the "position" table. At this time, "α"-data to show a correction volume are stored in the correction data register (68) prior to initiate the "playback" work, and "i"-data to show "how many times the abrasive tool is to reiteratively grind the same locus" are preset in the frequency division circuit (69) before the "playback" work.

By the way, the decoder (71), in an initial stage, indicates a zero "0" correction flag (72a) which is in "ON" state.

When the "playback" mode is initiated, the playback clock signal "PC" will be impressed to the address counter (63), which is caused to step forward by this playback clock signal "PC". A value counted by the address counter (63) will then be sent to the address decoder (64). And, this address decoder (64) acts to decode this counted value and to specify an address read out of the "position" table, so that the positional data are sequentially read out of the No.1 address of the "position" table whenever the playback clock signal is emitted and the thus readout positional data are then sent to the control circuit (65).

As noted above, in an initial stage, the zero "0" correction flag (72a) is in "ON" state, so that the control circuit (65) acts to determine the excitation pattern as per in the positional data read out of the "position" table (52) and the thus decided excitation pattern is sent to the motor drive units (61, 62), which cause the motors (25, 40) to drive according to this excitation pattern. The travelling route of the abrasive tool (18) is established on a series of points depending on the rotation of these motors (25,40). Thus, the abrasive tool (18) comes to travel on the locus "AO" shown by FIG. 15.

In this way, when the abrasive tool (18) grinds the workpiece surface along the point "a$_1$" ... "a$_n$" while travelling on the locus "AO", the address counter (63) will carry over its count value. If so, the abrasive tool (18) will start to return on the locus just now travelled and the positional data will again be read out of the No.1 address of the "position" table (52) and the abrasive tool will repeat the foregoing action likewise.

Thus, if the foregoing action is repeated by "i" times, the frequency division circuit (69) will generate its pulse signal at random and, the ring counter (70) will be caused to step forward by this pulse signal. The decoder (71) will then decode the value counted by said ring counter (70) and act to change a status of the flag (72) in the order of the zero "0" correction flag (72a)→the plus "+" correction flag (72b)→the zero "0" correction flag (72a)→the minus "−" correction flag (72c)→the zero "0" correction flag (72a).

On the other hand, the positional data are sequentially given to the "position" table in serial the order of No.1 address through the No."n" address, and at the same time the correction data are also given thereto from the correction data register (68) while changing its datum with a flow of "0"→"α"→"0".

When the plus "+" correction flag (12b) turns to "ON", the control circuit (65) acts to add the correction data "0"∼"α" sent from the correction data register (68) to the positional data read out of the "position" table (52) whenever the playback clock signal "PC" is emitted, and to compute and process the positional data after the correction was made and to decide the excitation pattern corresponding to the thus corrected positional data. Thus, the motor drive units (61, 62) drive the motors (25, 40) respectively according to the plus "+" corrected excitation pattern, so that the abrasive tool comes to grind to the extent of the peripheral areas of "A+α", as shown in FIG. 15, on the tool travelling locus while displacing the progress direction of the abrasive tool.

On the other hand, when the correction flag (12c) turns to "ON", the control circuit (65) acts to subtract the correction data "0"∼"α" given by the correction data register (68) from the positional data sequentially read out of the "position" table (52) whenever the playback clock signal "PC" is emitted and to compute and process the positional data after the correction was made, and to decide the excitation pattern corresponding to the thus corrected positional data. And, the motor drive units (61, 62) drive the motors (25, 40) respectively according to the minus "−" corrected excitation pattern, so that the abrasive tool displaces its progress direction and carries out the grind work to the extent of peripheral areas of "A+α" on the tool travelling locus, as shown in FIG. 15.

In this way, when the abrasive tool (18) carries out the grinding work in zigzags by "i" times along the points "a$_1$" through "a$_n$" on the locus while changing the progress direction of the tool indicated by the correction flag, the correction data value will then vary in such a way as "0"→"α"→"0", that is, its value returns again in to he original one. Therefore, the whole system of the grinding robot returns to a state of linear movement in the initial stage, and the abrasive tool starts to grind again along the route of the locus "AO".

In the foregoing embodiment, though the examples that the correction data of "0"→"α"→"0" are added to and subtracted from the status of flag (72) are shown, when doing such grinding work, these provide a random zigzag movements as far as practicable for the abrasive tool (18), to produce a fine work which is entirely free from facial differences.

Also, it is needless to say that there is no objection in using the known "position feedback" and "speed feedback" devices jointly with the robot control system according to the present invention. Further, at the time of grinding work, if the pressure applied on the grinding object is relatively given strongly when the zero "0" correction flag is in "ON" state and softly when the plus "+" and minus "−" correction flags are in "ON", a factor to create the facial difference will be more reduced.

As can be understood from the above explanation, according to the present invention, the peripheral areas of fiducial route of the abrasive tool can also be ground, so that no facial difference is created at a boundary area of the tool travelling locus; besides, it need not prolong the "teaching" time, nor require enlargement of the capacity of "position" table (52).

We claim:

1. A playback system grinding robot for controlling the movement of an abrasive tool in a horizontal plane and for grinding the surface of a workpiece to be ground, and having a dual degree-of-freedom of control in a polar coordinate system, comprising in combination:

a support means including a main vertical rotary axis and a secondary vertical axis;

a first arm having a first end and a second end, said first arm being supported rotatably about said main axis at said first end by said support means; said first arm having a head at said second end;

a second arm having a first end and a second end, said second arm being pivotably attached to said head of said first arm at said first end of said second arm; said second arm being pivotable about a vertical axis;

a third arm having a first end thereof connected for rotation with a revolution shaft, and a linkage means connected between an intermediate portion of said second arm and a second end of said third arm, for driving said second arm;

said revolution shaft about which said third arm rotates having an axis of rotation which is vertically disposed, said revolution shaft being disposed adjacent to and having its axis parallel with said main vertical rotary axis;

said second end of said second arm having a head; said head of said second arm having a vertical axis;

an abrasive tool connected to said head axis of said second arm so as to be freely turnable to different directions;

a holder mounted rotatably and vertically movably at said head end of said second arm and projecting downwardly for a predetermined length from a lower surface of said second arm, said holder having said abrasive tool fixed thereto at a lower end of said holder;

an air cylinder disposed on an upper surface of said head end of said second arm and biasing said holder downwardly by a piston rod;

a first servomotor for turning said first arm around said main axis;

a second servomotor for rotating said revolution shaft and turning said second arm;

a positional data generating means for generating positional data indicating a horizontal movement position of said abrasive tool;

a memory means for storing said positional data;

said positional data generating means including a first rotary encoder for detecting a turning angle of said first arm and a second rotary encoder for detecting a rotating angle of said revolution shaft;

whereby a direct teaching to said memory means occurs by manually moving said holder attached with said abrasive tool along the locus to be travelled, on the surface of the workpiece, thereby taking in angle pulses from said first and second rotary encoders and sequentially counting and storing the positional data of the abrasive tool on the horizontal plane;

a playback means for playing back said positional data to control movement of said abrasive tool;

and a robot control circuit for generating the angle pulses corresponding to said positional data so as to drive said first and second servomotors and conducting an automatic playback grinding operation on the taught locus.

2. The playback system grinding robot according to claim 1, further comprising: a means for generating directional data to indicate a horizontal movement direction of said abrasive tool;

a sampling clock producing a sampling clock signal having a specified period;

a means for storing said directional data along with said positional data according to said specified period of said sampling clock signal;

means for determining a variation volume of said stored positional data and said directional data; a playback speed deciding means;

a playback speed determined on the basis of said variation volume of said stored positional data and said directional data.

3. The playback system robot according to claim 1, further comprising:

a means for generating a corrective direction-indicating flag; said corrective direction-indicating flag for changing a correction status sequentially repetitively in order of plus correction, zero ("0") correction, minus correction, and so on in superposition to said positional data generating means for indicating horizontal movement position of the abrasive tool, and to the memory means for storing positional data;

a correction data register for storing correction data in advance to correct said positional data; zigzag status data created by a means for generating zigzag status data;

a fiducial locus; and an abrasive tool travelling locus controlled to take a random and zigzag route as against a fiducial locus indicated by the stored positional data in accordance with the positional data corrected in such a way as "0"→"α"→"0" by using said correction data stored in said corrected data register jointly with the zigzag status data shown by said corrective direction indicating flag.

* * * * *